(12) United States Patent
Chen et al.

(10) Patent No.: US 6,174,971 B1
(45) Date of Patent: *Jan. 16, 2001

(54) ZIEGLER-NATTA CATALYSTS FOR OLEFIN POLYMERIZATION

(75) Inventors: Hong Chen; Tim J. Coffy; Edwar S. Shamshoum, all of Houston, TX (US)

(73) Assignee: Fina Technology, Inc., Houston, TX (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/789,862

(22) Filed: Jan. 28, 1997

(51) Int. Cl.⁷ ........................................... C08F 4/44
(52) U.S. Cl. ..................... 526/125.3; 526/124.3; 526/124.9; 502/103; 502/104; 502/110; 502/111; 502/115; 502/119; 502/126
(58) Field of Search ..................... 502/110, 111, 502/115, 119, 126, 103, 104; 526/124.3, 124.9, 125.3

(56) References Cited

U.S. PATENT DOCUMENTS

| | | | | |
|---|---|---|---|---|
| 4,255,544 | * | 3/1981 | Kimura et al. ................ | 526/125.3 |
| 4,426,316 | * | 1/1984 | Gessell .................. | 502/169 |
| 4,526,943 | * | 7/1985 | Fuentes, Jr. et al. .............. | 526/133 |
| 4,634,749 | * | 1/1987 | Best .................... | 526/124.8 |
| 4,914,069 | * | 4/1990 | Job et al. ................ | 502/107 |
| 5,037,789 | * | 8/1991 | Buehler ................. | 526/119 |
| 5,155,187 | * | 10/1992 | Shelly ................... | 526/116 |
| 5,610,246 | * | 3/1997 | Buehler et al. ............. | 526/119 |
| 5,631,334 | * | 5/1997 | Zandona ................ | 526/113 |

FOREIGN PATENT DOCUMENTS

| | | |
|---|---|---|
| 3432759 | 9/1984 | (DE) . |
| 0068256 | 6/1981 | (EP) . |
| 0357135 | 3/1988 | (EP) . |
| 8404925 | 12/1984 | (WO) . |

* cited by examiner

*Primary Examiner*—David W. Wu
*Assistant Examiner*—R. Rabago
(74) *Attorney, Agent, or Firm*—Jim D. Wheelington

(57) ABSTRACT

A new synthesis of a Ziegler-Natta catalyst uses a multi-step preparation which includes treating a soluble magnesium compound with successively stronger chlorinating-titanating reagents. The catalyst may be used in polymerization of olefins, particularly ethylene, to produce a polymer with low amount of fines, large average fluff particle size and narrow molecular weight distribution. The catalyst has high activity and good hydrogen response.

121 Claims, No Drawings

ZIEGLER-NATTA CATALYSTS FOR OLEFIN POLYMERIZATION

BACKGROUND OF THE INVENTION

1. Field of the Invention

This invention relates to catalyst system for the polymerization of olefins, particularly, to a catalyst system comprising a supported Ziegler-Natta catalyst. The catalyst system is used to polymerize olefins, such as ethylene.

2. Description of the Prior Art

Polyolefin manufacturing processes typically involve the polymerization of olefin monomer with a Ziegler-Natta type catalyst. Catalyst systems for the polymerization of olefins are well known in the art. Typically, these systems include a Ziegler-Natta type polymerization catalyst component and a co-catalyst, usually an organoaluminum compound. Examples of such catalyst systems are shown in the following U.S. Pat. Nos. 3,574,138; 4,316,966; and 5,173,465, the disclosures of which are hereby incorporated by reference.

A Ziegler-Natta type polymerization catalyst is basically a complex derived from a halide of a transition metal, for example, titanium or vanadium, with a metal hydride and/or a metal alkyl, typically an organoaluminum compound, as a co-catalyst. The catalyst is usually comprised of a titanium halide supported on a magnesium compound complexed with an alkylaluminum co-catalyst.

SUMMARY OF THE INVENTION

Accordingly, an object of this invention is to synthesize a supported Ziegler-Natta catalyst for the polymerization of ethylene.

Also, an object of this invention is to produce a polyolefin having large particle size, a low amount of small particles or "fines" and low wax.

In addition, an object of this invention is to produce a catalyst with high activity and better hydrogen response.

These and other objects are accomplished by a catalyst system comprising a supported Ziegler-Natta catalyst used in a polymerization process for polymerizing olefins, especially ethylene.

The present invention provides for a catalyst for polymerization of olefins having high activity and better hydrogen response comprising:
- a) a supported Ziegler-Natta transition metal catalyst component; and
- b) an organoaluminum co-catalyst.

The present invention provides for a catalyst component comprising:
- a) a soluble magnesium compound of magnesium dialkoxide of the general formula $Mg(OR)_2$ where R is a hydrocarbyl or substituted hydrocarbyl of 1 to 20 carbon atoms;
- b) a mild chlorinating agent;
- c) a titanating agent; and
- d) an organoaluminum compound.

The present invention provides for a process for synthesizing a catalyst component comprising:
- a) synthesizing magnesium di(alkoxide) from magnesium dialkyl and alcohol;
- b) adding a mild chlorinating agent;
- c) adding a titanating agent;
- d) adding a second titanating agent;
- e) adding an organoaluminum compound.

The present invention also provides a process for the polymerization of olefins using the catalyst system described above to produce a polymer product having a narrow molecular weight distribution, a low amount of small particles and low wax comprising:
- a) selecting a conventional Ziegler-Natta transition metal catalyst component;
- b) contacting the catalyst component with an organoaluminum co-catalyst compound;
- c) introducing the catalyst system into a polymerization reaction zone containing a monomer under polymerization reaction conditions to form a polymer product; and
- e) extracting polymer product from the polymerization reaction zone.

DETAILED DESCRIPTION OF THE INVENTION

The synthesis procedure for Ziegler-Natta type catalysts for the polymerization of olefins is disclosed in U.S. Pat. Nos. 3,644,318, the disclosure of which is hereby incorporated, The standard synthesis procedure is:
- a) selecting a magnesium compound;
- b) adding a chlorinating agent;
- c) adding a titanating agent; and
- d) optionally, adding a preactivating agent.

The chlorinating agent and the titanating agent ma compound.

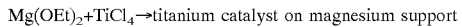
$Mg(OEt)_2 + TiCl_4 \rightarrow$ titanium catalyst on magnesium support The present invention modifies the synthesis procedure, and thus modifies the catalyst and the polymer product. The present invention is characterized by the following:
1) a soluble magnesium compound;
2) a mild chlorinating agent;
3) simultaneous chlorination-titanation steps with a mild reagent;
4) a second chlorination-titanation with a stronger reagent;
5) a preactivation step.

A proposed mechanism for the modified synthesis procedure is as follows:
1) $MgRR' + 2R"OH \rightarrow Mg(OR")_2$
2) $Mg(OR")_2 + ClAR'''_x \rightarrow "A"$
3) $"A" + TiCl_4/Ti(OR"")_{4} \rightarrow "B"$
4) $"B" + TiCl_4 \rightarrow "C"$
5) $"C" + TEAl \rightarrow$ preactivated catalyst While the exact composition of "A" is unknown, it is believed that it contains a partially chlorinated magnesium compound, one example of which may be ClMg(OR"). The first chlorination-titanation produces a catalyst ("B") which is probably a complex of chlorinated and partially chlorinated magnesium and titanium compounds and may possibly be represented by $(MgCl_2)_y \cdot (TiCl_x(OR)_{4-x})_z$. The second chlorination-titanation produces a catalyst ("C") which is also probably a complex of chlorinated and partially chlorinated magnesium and titanium compounds but different from "B" and may possibly be represented by $(MgCl_2)_{y'} \cdot (TiCl_{x'}(OR)_{4-x'})_{z'}$. It is expected that the level of chlorination of "C" would be greater than that of "B". This greater level of chlorination would produce a different complex of different compounds. While this description of the reaction products offers the most probable explanation of the chemistry at this time, the invention as described in the claims is not limited by this theoretical mechanism.

The soluble magnesium compound is preferably a non-reducing compound such as magnesium dialkoxide of the general formula $Mg(OR'')_2$ where R'' is a hydrocarbyl or substituted hydrocarbyl of 1 to 20 carbon atoms. A non-reducing compound has the advantage of forming $MgCl_2$ instead of insoluble $Ti^{+3}$ species formed by reduction of compounds such as MgRR' which tend to form catalysts having a broad particle size distribution. In addition, $Mg(OR'')_2$ is less reactive than MgRR' and the chlorination with a mild chlorinating agent, followed by a simultaneous chlorination-titanation with a mild reagent and a second chlorination-titanation with a stronger reagent are gradual and successively stronger reactions which may result in more uniform product, i.e., larger catalyst particles and better catalyst particle size control.

Magnesium dialkoxide, such as magnesium di(2-ethylhexoxide), may be produced by reacting an alkyl magnesium compound (MgRR'), such as butyl ethyl magnesium (BEM), with an alcohol (ROH), such as 2-ethylhexanol.

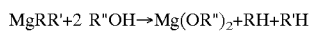

In the case of BEM, RH and R'H are butane and ethane, respectively. The reaction takes place at room temperature and the reactants form a solution.

The magnesium dialkyl [MgRR'] may be any magnesium dialkyl where R and R' are alkyl groups of 1–10 carbon atoms. R and R' may be the same or different. Examples of the magnesium dialkyl are magnesium diethyl, magnesium dipropyl, magnesium dibutyl, butylethylmagnesium, etc. Butylethylmagnesium (BEM) is the preferred magnesium dialkyl.

The alcohol may be any alcohol of the general formula R''OH where R'' is an alkyl group of 4–20 carbon atoms. The alcohol may be linear or branched. Examples of the alcohol are butanol, isobutanol, 2-ethylhexanol, etc. The preferred alcohol is 2-ethylhexanol.

Alkyl magnesium compounds are highly associative due to electron-deficient bonding which results in a high molecular weight species which is very viscous in solution. This high viscosity may be reduced by the addition of an aluminum alkyl, such as triethylaluminum, which disrupts the association between the individual alkyl magnesium molecules. The preferred molar ratio of alkyl aluminum to magnesium is 0.001:1 to 1:1, more preferably 0.01 to 0.1:1 and most preferably 0.03:1 to 0.05:1. In addition, an electron donor such as an ether, e.g., diisoamyl ether (DIAE) may be used to further reduce the viscosity of the alkyl magnesium. The preferred molar ratio of electron donor to magnesium is 0:1 to 10:1 and more preferably is 0.1:1 to 1:1.

The chlorinating agent is preferably a monochloride compound which only partially chlorinates the magnesium alkoxide. The chlorinating agent is of the general formula $ClAR'''_x$ or $ClAOR'''_x$, where A is a nonreducing oxyphilic compound which is capable of exchanging one chloride for an alkoxide, R''' is alkyl and x is the valence of A minus 1. Examples of A are titanium, silicon, aluminum, carbon, tin and germanium, most preferred of which is titanium and silicon wherein x is 3. Examples of R''' are methyl, ethyl, propyl, isopropyl and the like having 2–6 carbon atoms. Examples of a chlorinating agent effective in the present invention are $ClTi(O^iPr)_3$ and $ClSi(Me)_3$.

The chlorinating-titanating agent is preferably a tetra-substituted titanium compound with all four substituents being the same and the substituents being a chloride or an alkoxide or phenoxide with 2 to 10 carbon atoms, such as $TiCl_4$ or $Ti(OR'''')_4$. The chlorinating-titanating agent may be a single compound or a combination of compounds. The synthesis provides an active catalyst after the first chlorination-titanation; however, chlorination-titanation preferably is done twice, is a different compound or combination of compounds at each addition and is a stronger chlorination-titanation at the second addition.

The first chlorination-titanation agent is preferably a mild titanating agent which is preferable a blend of a titanium chloride and a titanium alkoxide. More preferably, the first chlorinating-titanating agent is a blend of $TiCl_4$ and $Ti(OBu)_4$ in a range from 0.5:1 to 6:1 $TiCl_4/Ti(OBu)_4$ most preferably from 2:1 to 3:1. The molar ratio of titanium to magnesium in the first chlorination-titanation is preferably 3:1. It is believed that the blend of titanium chloride and titanium alkoxide react to form a titanium alkoxyhalide, $Ti(OR)_aX_b$, where OR and X are an alkoxide and halide, respectively, a+b is the valence of titanium which is typically 4 and both a and b may be fractional, e.g, a=2.5 and b=1.5.

In the alternative, the first chlorinating-titanating agent may be a single compound. Examples of the first chlorinating-titanating agent as a single compound are $Ti(OC_2H_5)_3Cl$, $Ti(OC_2H_5)_3Cl$, $Ti(OC_3H_7)_2Cl_2$, $Ti(OC_3H_7)_3Cl$, $Ti(OC_4H_9)Cl_3$, $Ti(OC_6H_{13})_2Cl_2$, $Ti(OC_2H_5)_2Br_2$ and $Ti(OC_{12}H_{25})Cl_3$.

Optionally, an electron donor may be added with the first mild chlorinating-titanating agent. It is believed that the addition of an electron donor at this step may result in better particle size control. The electron donor is preferably an alkylsilylalkoxide of the general formula $RSi(OR')_3$, e.g., methylsilyltriethoxide $[MeSi(OEt_3)]$, where R and R' are alkyls with 1–5 carbon atoms and may be the same or different.

The second stronger chlorinating-titanating agent is preferably a titanium chloride, more preferably titanium tetrachloride $[TiCl_4]$. The range of titanium to magnesium in the second chlorination-titanation is 0.1:1 to 2:1 and is preferably 0.5:1 to 1:1.

The preactivating agent is preferably an organoaluminum compound. The organoaluminum preactivating agent is preferably an aluminum alkyl of the formula $AlR\hat{\ }_3$ where $R\hat{\ }$ is an alkyl having 1–8 carbon atoms or a halide, R' being the same or different and at least one R is an alkyl. The organoaluminum preactivating agent is preferably a trialkyl aluminum, such as trimethyl aluminum (TMA), triethyl aluminum (TEAl) and triisobutyl aluminum (TiBAl). The preferred preactivating agent is TEAl. The molar ratio of Al to titanium is in the range from 0.1:1 to 2:1 and preferably is 0.5:1 to 1.2:1 and more preferably is approximately 0.8:1.

The specific synthesis procedure used was:
a) synthesizing soluble magnesium dialkoxide [magnesium di (2-ethyl-hexoxide)] from magnesium dialkyl [butylethylmagnesium] and an alcohol [2-ethylhexanol], optionally adding an aluminum alkyl (triethylaluminum) for viscosity control;
b) adding a mild monochloro-chlorinating agent [ClTi($O^iPr_3$)];
c) adding a first mild chlorinating-titanating agent blend of titanium tetrahalide and titanium tetra-alkoxide [$TiCl_4/Ti(OBu)_4$];
d) adding a second stronger chlorinating-titanating agent of a titanium tetrahalide [$TiCl_4$];
e) adding an alkylaluminum [TEAl] to preactivate the catalyst.

The conventional supported Ziegler-Natta transition metal compound catalyst component as described above may be used in the polymerization of olefins, particularly ethylene. The transition metal compound is preferably of the general formula $MR^1x$ where M is the metal, $R^1$ is a halogen or a hydrocarbyloxy and x is the valence of the metal. Preferably, M is a Group IVB metal, more preferably titanium. Preferably, $R^1$ is chlorine, bromine, an alkoxy or a phenoxy, more preferably chlorine. Illustrative examples of the transition metal compounds are $TiCl_4$, $TiBr_4$, $Ti(OC_2HS)_3Cl$, $Ti(OC_2H_5)_3Cl$, $Ti(OC_3H_7)_2Cl_2$, $Ti(OC_4H)_3Cl$, $Ti(OC_6H_{13})_2Cl_2$, $Ti(OC_8H_{17})_3Cl$, $Ti(OC_2H_5)_2Br_2$ and $Ti(OC_{12}H_{25})Cl_3$. Mixtures of the transition metal compounds may be used. No restriction on the number of transition metal compounds is made as long as at least one transition metal compound is present.

The support should be an inert solid which is chemically unreactive with any of the components of the conventional Ziegler-Natta catalyst. The support is preferably a magnesium compound. Examples of the magnesium compounds which are to be used to provide a support for the catalyst component are magnesium halides, dialkoxymagnesiums, alkoxymagnesium halides and carboxylates of magnesium. The preferred magnesium compound is a magnesium chloride ($MgCl_2$).

The catalyst is activated with an organoaluminum cocatalyst. The organoaluminum co-catalyst is preferably an aluminum alkyl of the formula $AlR R^{\hat{}}_3$ where R $R^{\hat{}}$ is an alkyl having 1–8 carbon atoms or a halide, $R^{\hat{}}$ being the same or different and at least one $R^{\hat{}}$ is an alkyl. The organoaluminum co-catalyst may be an aluminum trialkyl, an aluminum dialkyl halide or an aluminum alkyl dihalide. More preferably, the organoaluminum co-catalyst is trialkyl aluminum, such as trimethyl aluminum (TMA), triethyl aluminum (TEAl) and triisobutyl aluminum (TiBAl). The preferred aluminum alkyl is TEAl.

A Ziegler-Natta catalyst may be pre-polymerized to improve the performance of the catalyst. Generally, a pre-polymerization process is effected by contacting a small amount of monomer with the catalyst after the catalyst has been contacted with the co-catalyst. A pre-polymerization process is described in U.S. Pat. Nos. 5,106,804; 5,153,158; and 5,594,071, hereby incorporated by reference.

The catalyst may be used in any known process for the homopolymerization or copolymerization of olefins. The polymerization process may be bulk, slurry or gas phase. It is preferred to use a catalyst synthesized above in a slurry phase polymerization in temperature range of 50–100° C., preferably 50–120° C., more preferably 70–80° C., and a pressure range of 50–800 psi, preferably 80–600 psi, more preferably 100–150 psi. The olefin monomer may be introduced into the polymerization reaction zone in a diluent which is a nonreactive heat transfer agent which is liquid at the reaction conditions. Examples of such a diluent are hexane and isobutane. For the copolymerization of ethylene with another alpha-olefin, such as butene, the second alpha-olefin may be present at 0.01–20 mole percent, preferably 0.02–1 mole percent and more preferably about 0.0625 mole percent.

For the polymerization of propylene it is preferably to include an internal electron donor in the synthesis of the catalyst and an external electron donor or stereoselectivity control agent (SCA) to activate the catalyst at polymerization. An internal electron donor may be used in the formation reaction of the catalyst during the chlorination or chlorination/titanation steps. Compounds suitable as internal electron-donors for preparing conventional supported Ziegler-Natta catalyst components include ethers, ketones, lactones, electron donors compounds with N, P and/or S atoms and specific classes of esters. Particularly suitable are the esters of phthalic acid, such as diisobutyl, dioctyl, diphenyl and benzylbutylphthalate; esters of malonic acid, such as diisobutyl and diethylmalonate; alkyl and arylpivalates; alkyl, cycloalkyl and arylmaleates; alkyl and aryl carbonates such as diisobutyl, ethyl-phenyl and diphenyl-carbonate; succinic acid esters, such as mono and diethyl succinate.

External donors which may be utilized in the preparation of a catalyst according to the present invention include organosilane compounds such as alkoxysilanes of general formula $SiR_m(OR')_{4-m}$ where R is selected from the group consisting of an alkyl group, a cycloalkyl group, an aryl group and a vinyl group; R' is an alkyl group; and m is 0–3, wherein R may be identical with R'; when m is 0, 1 or 2, the R' groups may be identical or different; and when m is 2 or 3, the R groups may be identical or different.

Preferably, the external donor of the present invention is selected from a silane compound of the following formula:

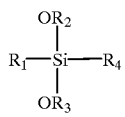

wherein $R_1$ and $R_4$ are both an alkyl or cycloalkyl group containing a primary, secondary or tertiary carbon atom attached to the silicon, $R_1$ and $R_4$ being the same or different; $R_2$ and $R_3$ are alkyl or aryl groups. $R_1$ may be methyl, isopropyl, cyclopentyl, cyclohexyl or t-butyl; $R_2$ and $R_3$ may be methyl, ethyl, propyl, or butyl groups and not necessarily the same; and $R_4$ may also methyl, isopropyl, cyclopentyl, cyclohexyl or t-butyl. Specific external donors are cyclohexylmethyldimethoxy silane (CMDS), diisopropyldimethoxysilane (DIDS) cyclohexylisopropyl dimethoxysilane (CIDS), dicyclopentyldimethoxysilane (CPDS) or di-t-butyl dimethoxysilane (DTDS).

The invention having been generally described, the following examples are given as particular embodiments of the invention and to demonstrate the practice and advantages thereof. It is understood that the examples are given by way of illustration and are not intended to limit the specification or the claims to follow in any manner.

The following parameters were varied in the Examples below:
1. Different chlorination/precipitation reagent
2. Catalyst preparation with and without using the monochloride
3. Use of an alternative monochloride
4. Use of diisoamyl ether (DIAE) or $MeSi(OEt)_3$ as an electron donor Catalyst preparation

EXAMPLE 1

50 mmole of BEM was weighed into a 100 ml measuring cylinder in the nitrogen box. 1.5 mmole of TEAl was added to the BEM solution. The BEM/TEAL mixture was diluted to 100 ml with heptane, and transferred to a 1 L 5-neck flask. The viscosity of this mixture was much lower than BEM itself. The measuring cylinder was rinsed twice with 50 ml portions of heptane, which was also transferred into the 1 L flask. The solution was stirred at room temperature at 200 rpm.

104.5 mmole 2-Et-HexOH was weighed into a 50 ml measuring cylinder and diluted to 50 ml with heptane. The alcohol solution was transferred to the 60 ml addition funnel on the 1 L flask, and added dropwise to the BEM/TEAL solution at RT over 50 mins. The addition funnel was rinsed with 50 ml heptane. The reaction mixture was stirred at room temperature for another hour. 50 mmole ClTi(O$^i$Pr)$_3$ (hexane solution) was weighed into a 100 ml measuring cylinder and transferred to the 60 ml addition funnel. The measuring cylinder was rinsed with 10 ml heptane. The ClTi(O$^i$Pr)$_3$ solution was added dropwise to the flask at room temperature over 70 mins. The reaction mixture was stirred at room temperature for another hour.

19.0 g TiCl$_4$ was weighed into a 100 ml measuring cylinder and diluted with heptane to 100 ml. The TiCl$_4$ solution was transferred to the addition funnel and added dropwise to the flask at room temperature over 55 mins. The reaction mixture was stirred at room temperature for one hour. The reaction mixture was then allowed to settle. The supernatant was decanted. The solid was washed four times with 200 ml portions of heptane at 40° C. The solid was dried in vacuo at 40° C. for 2 hrs. (white powder, ca. 9.6 g).

EXAMPLE 2

50 mmole of BEM was weighed into a 100 ml measuring cylinder and 1.5 mmole of TEAl was added to the BEM solution. The BEM/TEAL mixture was diluted to 100 ml with heptane. The BEM solution was transferred to a 1 L flask equipped with a thermometer, a mechanical stirrer, a 60 ml addition funnel and a condenser with a gas inlet. The measuring cylinder was rinsed with 5 ml heptane. The solution was agitated at 200 rpm at room temperature.

104.5 mmole of 2-Et-HexOH was weighed into a 50 ml measuring cylinder and diluted to 50 ml with heptane. The alcohol solution was transferred to the 60 ml addition funnel on the 1 L flask. The cylinder was rinsed with 10 ml heptane. The alcohol solution was added dropwise to the BEM/TEAL solution at room temperature over 33 mins. The addition funnel was rinsed with 50 ml heptane. The reaction mixture was stirred at room temperature for another hour.

50 mmoles of ClTi(O$^i$Pr)$_3$ (hexane solution) was weighed into a 100 ml measuring cylinder and transferred to the 60 ml addition funnel on the 1 L flask. The measuring cylinder was rinsed with 10 ml heptane. The ClTi(O$^i$Pr)$_3$ solution was added dropwise to the flask at room temperature over 46 mins. The addition funnel was rinsed with 10 ml heptane. The reaction mixture was stirred at room temperature for two hours.

19.0 g TiCl$_4$ and 17.0 g Ti(OBu)$_4$ were weighed and mixed in a 100 ml measuring cylinder in the nitrogen box. The mixture was diluted with heptane to 100 ml, and transferred to the addition funnel and added dropwise to the flask at room temperature over 1.5 hrs. The reaction mixture was stirred at room temperature for three hours. The reaction mixture was then allowed to settle. The supernatant was decanted. The white solid was washed 4 times with 200 ml portions of heptane.

9.5 g TiCl$_4$ was weighed into a 100 ml measuring cylinder and diluted to 50 ml with heptane. The TiCl$_4$ solution was transferred to the 60 ml addition funnel and added dropwise to the flask at room temperature over 35 mins. The reaction mixture was stirred at room temperature for another two hours. The reaction mixture was allowed to settle. The solid was washed four times with 150 ml portions of heptane. The solid was dried in vacuo at room temperature for 1.5 hrs. (off-white powder, ca. 5.5 g).

EXAMPLE 3

The procedure of Example 2 was used to prepare a solution (A) from BEM/TEAL+2-Et-HexOH+ClTi(O$^i$Pr)$_3$.

17.0 g Ti(OBu)$_4$ was weighed into a 50 ml measuring cylinder in the nitrogen box. 1.78 g MeSi(OEt)$_3$ was added. The mixture was diluted with heptane to 50 ml. This solution was transferred to a 1 L 5-neck flask with standard equipment. The solution was stirred at room temperature at 150 rpm. Then 19.0 g TiCl$_4$ diluted to 50 ml in heptane was added to the Ti(OBu)$_4$/MeSi(OEt)$_3$ solution. This solution (B) was stirred at room temperature for 35 mins.

The solution A prepared above was transferred to the 60 ml addition funnel on the 1 L flask, and added dropwise to the flask at room temperature over 1 hr 50 mins. The reaction mixture was stirred at ambient temperature for another 30 mins and then allowed to settle at room temperature.

The supernatant was decanted. The solid was washed three times with 200 ml portions of hexane. 200 ml fresh hexane was added to the flask and the slurry was agitated at 150 rpm at room temperature.

9.5 g TiCl$_4$ was weighed into a 50 ml measuring cylinder and diluted to 50 ml with hexane. The TiCl$_4$ solution was transferred to the 60 ml addition funnel on the 1 L flask, and added dropwise to the flask in 25 mins. The reaction mixture was stirred at room temperature for another two hours. The reaction mixture was then allowed to settle. The supernatant was decanted. The solid was washed 4 times with 200 ml portions of hexane. The solid was dried in vacuo at room temperature for 2 hrs. The yield of the solid was ca. 5.1 g.

EXAMPLE 4

The procedure to prepare this catalyst is the same as that for Example 3, except that the mixture of TiCl$_4$Ti(OBu)$_4$MeSi(OEt)$_3$ (2/1/0.2) was added to the solution "A" prepared from BEM/TEAL (1/0.03)+2-Et-HexOH (2)+ClTi(O$^i$Pr)$_3$ (1). The resultant white solid was dried in vacuo at room temperature for 1.5 hours (ca. 4.2 g).

EXAMPLE 5

The Mg(OR)$_2$ solution was prepared with BEM/TEAL (50 mmole/1.5 mmole) and 2-Et-HexOH (104.5 mmole) as in Example 2. The viscous solution was stirred at ambient temperature at 150 rpm.

104.5 mmole of ClTi(O$^i$Pr)$_3$ (hexane solution) was weighed into a 100 ml measuring cylinder and then transferred to the addition funnel on the 1 L flask. The ClTi(O$^i$Pr)$_3$ solution was added dropwise to the flask over 1.5 hrs. The reaction mixture was stirred at room temperature for another 1.5 hrs. The reaction mixture was allowed to settle. The settling of the solid was very slow. The supernatant was decanted and the solid was re-slurried in 150 ml heptane.

A solution of TiCl$_4$/Ti(OBu)$_4$/MeSi(OEt)$_3$ (100 mmole/50 mmole/10 mmole) was prepared in the same way as for the preparation of Example 3. This solution was transferred to the 60 ml addition funnel on the 1 L flask, and added dropwise to the flask at room temperature over a period of 2 hrs. The reaction mixture was stirred at room temperature for another hour. The reaction mixture was allowed to settle. The settling of the solid was much faster than before the TiCl$_4$ addition. The supernatant was decanted. The solid was washed four times with 150 ml portions of heptane.

9.5 g TiCl$_4$ was weighed into a 50 ml measuring cylinder and diluted to 40 ml with heptane. The TiCl$_4$ solution was transferred to the 60 ml addition funnel. The cylinder was rinsed with 10 ml heptane. The TiCl$_4$ solution was added dropwise to the flask at room temperature over 35 mins. The reaction mixture was stirred at room temperature for another hour. The reaction mixture was allowed to settle. The supernatant was decanted. The solid was washed four times with 150 ml portions of heptane. The solid was dried in vacuo at room temperature for 2 hrs. The yield of the dried catalyst (white, static) was 1.3 g.

EXAMPLE 6

The solution of $Mg(OR)_2$ was prepared with BEM/TEAL (50 mmole/1.5 mmole) and 2-Et-HexOH (104.5 mmole) using the procedure of Example 2.

19.0 g $TiCl_4$ was weighed into a 50 ml measuring cylinder and diluted to 20 ml with heptane. The $TiCl_4$ solution was cannulated into a 100 ml flask containing 17.0 g $Ti(OBu)_4$. The orange-brown mixture was stirred at room temperature for 20 mins., then transferred to the 60 ml addition funnel on the 1 L flask. The 100 ml flask was rinsed with a small amount of heptane. The $TiCl_4Ti(OBu)_4$ solution was added dropwise to the 1 L flask at room temperature over 55 mins. The reaction mixture was stirred at room temperature for another hour. The reaction mixture was then allowed to settle. The settling was very slow (>1.5 hrs). The clear, light yellow supernatant was decanted. The white solid was washed three times with 150 ml portions of heptane. The solid was dried in vacuo at room temperature for four hours. The solid was yellow, lumpy. The flask was then heated to 70° C. and the solid was dried for another hour. The resultant solid was more powdery but still lumpy. The yield of the solid was ca. 8.3 g.

EXAMPLE 7

The preparation of $Mg(OR)_2$ solution was the same as Example 6 except that 1.58 g DIAE was added to the mixture of BEM and TEAL before the reaction. The viscosity of the BEM/TEAL solution was drastically reduced upon the addition of DIAE. The reaction was carried out at room temperature with 150 rpm agitation.

A mixture of 17.0 g $Ti(OBu)_4$ and 19.0 g $TiCl_4$ was prepared in the same manner as in Example 2. This solution was added dropwise to the reaction flask at room temperature over 55 mins. After the addition was completed, the reaction mixture was stirred at room temperature for another hour. The reaction mixture was then allowed to settle. The flask was slowly heated to 50° C. during the top settling. The supernatant was decanted. The white solid was washed four times with 150 ml portions of heptane at 45–50° C. The solid was dried in vacuo at 50–55° C. for 3 hrs. The solid (8.7 g) was more powdery than that of Example 6 but was still lumpy.

EXAMPLE 8

The preparation of $Mg(OR)_2$ solution was the same as for Example 7. The reaction was carried out at room temperature with 150 rpm agitation.

50 mmole of $ClTi(O^iPr)_3$ was weighed into a 100 ml measuring cylinder and transferred to the 60 ml addition funnel. The measuring cylinder was rinsed with 10 ml heptane. The $ClTi(O^iPr)_3$ solution was added dropwise to the flask at room temperature over 40 mins. The addition funnel was rinsed with 5 ml heptane. The reaction mixture was stirred at room temperature for another hour.

A mixture of 17.0 g $Ti(OBu)_4$ and 19.0 g $TiCl_4$ was prepared as in Example 6. The $TiCl_4Ti(OBu)_4$ solution was transferred to the addition funnel and added dropwise to the flask at room temperature over 75 minutes. The reaction mixture was stirred at room temperature for one hour. The reaction mixture was then allowed to settle. The supernatant was decanted. The solid was washed twice with 150 ml portions of heptane, then re-slurried in 150 ml heptane.

9.5 g $TiCl_4$ was weighed into a 50 ml measuring cylinder and diluted to 60 ml with heptane. The $TiCl_4$ solution was added dropwise to the flask at room temperature over 40 mins. The reaction mixture was stirred at room temperature for another hour. The reaction mixture was then allowed to settle. The supernatant was decanted. The solid was washed four times with 150 ml portions of heptane. The solid was dried in vacuo at room temperature for 2 hrs. The yield of the solid white powder was ca. 9.6 g.

EXAMPLE 9

The solution of $Mg(OR)_2$ was prepared as in Example 2 using BEM/TEAL and 2-Et-HexOH. The reaction was carried out at room temperature under agitation of 150 rpm.

13.5 g $ClSiMe_3$ was weighed into a 50 ml measuring cylinder and diluted with heptane to 40 ml. The solution was transferred to the 60 ml addition funnel on the 1 L flask. The cylinder was rinsed with 10 ml heptane. The $ClSiMe_3$ solution was added dropwise to the 1 L flask at room temperature over 30 mins. The reaction mixture was stirred at room temperature for another 1 h and 45 mins.

A mixture of 17.0 g $Ti(OBu)_4$ and 19.0 g $TiCl_4$ was prepared as for Example 6. This mixture was added dropwise to the 1 L flask at room temperature over 70 mins. The reaction mixture was stirred at room temperature for another hour. The reaction mixture was allowed to settle. The settling was very slow. The supernatant was decanted. The solid was washed with 150 ml heptane at room temperature. The solid was dried in vacuo for 2 hrs. The catalyst was very lumpy with a yellow color. It was heated to 70° C. and dried for another hour. The solid became more powdery but still lumpy. The yield of the solid was 9.7 g.

EXAMPLE 10

The reaction was carried out as in Example 9, except that the $ClSiMe_3$ solution was added to the $Mg(OR)_2$ solution at 50° C. instead of room temperature.

The addition of the $TiCl_4/Ti(OBu)_4$ solution was carried out room temperature over 75 minutes. The reaction mixture was stirred at room temperature for one hour after the addition of the $TiCl_4/Ti(OBu)_4$ solution was completed. Then the reaction mixture was allowed to settle. The supernatant was decanted and the solid was washed twice with 150 ml portions of heptane. The solid was then re-slurried in 150 ml fresh heptane.

A second titanation was performed at room temperature using a 50 ml heptane solution containing 9.5 g $TiCl_4$. The reaction mixture was stirred at room temperature for one hour after the $TiCl_4$ addition was completed. Then the reaction mixture was allowed to settle. The supernatant was decanted. The solid was washed four times with 150 ml portions of heptane. The solid was dried in vacuo for 1 h. The catalyst was heated to 55–60° C. and dried for another 2.5 hrs. The final solid was off-white and a little lumpy.

EXAMPLE 11

10 g $Mg(OEt)_2$ was added to a 3-neck 500 mL flask fitted with a 60 mL dropping funnel, a condenser with gas inlet and a septum. 200 mL heptane was added and the slurry was stirred while heating to the reaction temperature (85° C.). 24 mL $TiCl_4$ was added to the stirred slurry over 15 minutes. The reaction mixture was stirred at 85° C. for 5.5 hrs. The reaction mixture was cooled to 75° C. and allowed to settle. The supernatant was decanted. The solid was washed four times each with ~100 mL heptane at 70° C. The solid was slurried in ~100 mL dry octane and heated to 120° C. for 18 hours. The slurry was cooled to 70° C. and then the solid was allowed to settle. The supernatant was decanted. The solid was dried at 70° C. for 2 hours in vacuo. The yield was ca. 14 g.

Polymerization

A four liter reactor was fitted with four mixing baffles with two opposed pitch mixing propellers. Ethylene and hydrogen were introduced to the reactor vessel via mass flow controllers while a back-pressure regulator keeps the internal reaction pressure constant. The reaction temperature was maintained (in the reactor jacket) by steam and cold water using a valve linked to a controller.

Hexane was used as diluent and TEAL is used as cocatalyst for all polymerizations.

Polymerizations were carried out under the following conditions:

TABLE I

Polymerization Conditions

| Temperature | 80° C. |
| Reaction Time | 60 minutes |
| Catalyst | 5–10 mg |

| Example | Yield (g) | Productivity (g/g · hr) | % fines (<125 μm) | Average Catalyst Particle Size (microns) |
| --- | --- | --- | --- | --- |
| 1. | 283 | 21,000 | 34.5 | 10.6 |
| 2. | 280 | 21,000 | 20.5 | 15.5 |
| 3. | 369 | 28,000 | 17 | 19.6 |
| 4. | 327 | 25,000 | 5.4 | 15.8 |
| 5. | 149 | 25,000 | 10 | 12.2 |
| 6. | 410 | 31,000 | 19.3 | 10.3 |
| 7. | 301 | 23,000 | 17.9 | 12.5 |
| 8. | 375 | 28,000 | 1.0 | 11.0 |
| 9. | 49 | 4,000 | 7.1 | 21.8 |
| 10. | 330 | 20,000 | 32.7 | 26.5 |
| 11. | 260 | 26,000 | 5.0 | 9.0 |

An improved catalyst synthesis is as follows: BEM, TEAL and DIAE are added in a molar ratio of 1:0.03:0.6 in a solution at room temperature. An amount of 2-Et-HexOH equal to 2.09 equivalents is added to the BEM/TEAl/DIAE solution at room temperature to form magnesium dialkoxide. One equivalent of ClTi(O$^i$Pr)$_3$ is added to the solution at room temperature. A mixture of TiCl$_4$ and Ti(OBu)$_4$ as a titanating agent in a molar ratio of 2:1 is added to the solution at room temperature to form an initial catalyst. A second titanation with TiCl$_4$ in the amount of one equivalent is performed on the catalyst solution.

The following parameters were varied in the Examples below:
1. The concentration of the TiCl$_4$/Ti(OBu)$_4$ mixture—Example 12
2. The amount of TiCl$_4$ used for the second titanation—Example 13
3. The titanation temperature—Examples 14 and 17
4. The amount of DIAE—Examples 15 and 16
5. Heat treatment after titanation—Examples 18 and 20
6. The preactivation of the catalyst—Example 19
7. The impact of TEAl during synthesis—Example 21
8. The slurry concentration—Example 22

EXAMPLE 12

The first two steps of the synthesis, i.e., the preparation of Mg(OR)$_2$ and its reaction with ClTi(O$^i$Pr)$_3$ were carried out using the same procedure as for Example 8.

19.0 g TiCl$_4$ was weighed into a 50 ml measuring cylinder and diluted to 50 ml with heptane. The TiCl$_4$ solution was cannulated into a 200 ml flask containing 17.0 g Ti(OBu)$_4$. The cylinder was rinsed with 20 ml heptane. The orange-brown mixture was stirred at room temperature for 35 mins. The solution (ca. 86 ml) was transferred to the 60 ml addition funnel on the 1 L flask (60 ml first), and added dropwise to the flask at room temperature over 92 minutes. The reaction mixture was stirred at room temperature for one hour, then allowed to settle. The supernatant was decanted. The solid was washed twice with 180 ml portions of heptane, then re-slurried in 180 ml heptane.

9.5 g TiCl$_4$ was weighed into a 50 ml measuring cylinder and diluted to 60 ml with heptane. The TiCl$_4$ solution was added dropwise to the flask at room temperature over 35 mins. The reaction mixture was stirred at room temperature for another hour and then was allowed to settle. The supernatant was decanted. The solid was washed four times with 200 ml portions of heptane. The solid was dried in vacuo at room temperature for 2 hrs. The yield of the white solid was ca. 4.8 g.

EXAMPLE 13

The procedure to prepare this catalyst was the same as that for catalyst Example 12, except that 4.75 g TiCl$_4$ (0.5 eq.) instead of 9.5 g TiCl$_4$ (1 eq.) was used for the second titanation. The yield of the solid catalyst was ca. 5.2 g.

EXAMPLE 14

The procedures to prepare this catalyst is the same as that for Example 13, except that the first titanation using TiCl$_4$/Ti(OBu)$_4$ was carried out at 0° C. instead of the ambient temperature. The rate of precipitation seemed to be slower than the room temperature reaction, but the particle size was very small. The ice bath was removed once the addition of TiCl$_4$/Ti(OBu)$_4$ was completed, and the reaction mixture was stirred at ambient temperature for one hour. The catalyst settling was much slower than the catalyst prepared at room temperature. The second titanation was carried out in the same way as for Example 13. The resultant white solid was dried in vacuo at room temperature for 2.5 hours (ca. 6.7 g). The dried solid catalyst was slightly static and looked very fluffy.

EXAMPLE 15

The catalyst of this example was prepared using the same procedures as for Example 13 except that 3.16 g DIAE (0.4 eq. to Mg) was used as opposed to 1.58 g (0.2 eq.) DIAE. The reaction proceeded similarly to Example 13. The yield of the solid was 5.0 g.

EXAMPLE 16

The catalyst of this example was prepared using the same procedures as for Example 13, except that 4.74 g DIAE (0.6 eq. to Mg) was used as opposed to 1.58 g (0.2 eq.) DIAE. The reaction proceeded similarly to Example 13. The yield of the solid was 5.1 g.

EXAMPLE 17

The preparation of the catalyst of this example followed the same procedures as for Example 16, except that the first titanation was carried out at 50° C. instead of the ambient temperature. No preactivation was performed on this catalyst. The yield of the solid catalyst was 7.7 g.

EXAMPLE 18

The first few steps of the catalyst synthesis was the same as that for Example 16. However, after the first titanation was completed and the reaction mixture was stirred at room temperature for one hour, the reaction mixture was heated to 50° C. and stirred for one hour. The rest of the synthesis proceeded as per Example 16. The yield of the dried solid catalyst was 4.7 g.

EXAMPLE 19

The first few steps of the reaction were carried out in the same way as Example 16.

After the second titanation 7.83 mmol TEAL was weighed into a 100 ml measuring cylinder and diluted to 60 ml with heptane. The TEAL solution was added dropwise to the 1 L flask at room temperature over 34 mins. The reaction mixture was stirred at ambient temperature for another hour. The reaction mixture was allowed to settle. The supernatant was decanted and the brown solid was washed four times with 200 ml portions of heptane. The solid was dried in vacuo at room temperature for 2.5 hrs (7.4 g).

EXAMPLE 20

The catalyst synthesis followed the same procedures as that for Example 17, except that a preactivation was performed after the second titanation similar to Example 19 using 7.24 mmole TEAL at room temperature. The yield of the dried, brown solid catalyst was 6.6 g.

EXAMPLE 21

50 mmol of BEM in heptane solution was weighed into a 100 ml measuring cylinder. 4.74 g DIAE (30 mmole) was added to the BEM solution. The mixture was diluted to 80 ml with heptane, and transferred to a 1 L 5-neck flask with standard set-up. The solution was stirred at room temperature at 150 rpm.

13.00 g 2-Et-HexOH was weighed into a 50 ml measuring cylinder and diluted to 50 ml with heptane. The alcohol solution was transferred to the 60 ml addition funnel on the 1 L flask. The cylinder was rinsed with 10 ml heptane. The 2-Et-HexOH solution was added dropwise to the 1 L flask at room temperature over 30 minutes. At the end of the addition, the reaction mixture became a highly viscous gel.

1.5 mmole TEAL was weighed into a 20 ml Wheaton bottle and diluted to 10 ml with heptane. The TEAL solution was cannulated into the 1 L flask. The viscosity of the reaction mixture remained high and still a lot of gel was sticking on the wall. The reaction mixture was stirred at room temperature for 20 mins, and no significant improvement in viscosity was observed.

0.59 g 2-Et-HexOH was weighed into a 20 ml Wheaton bottle and diluted to 10 ml with heptane. The solution was transferred to the 60 ml addition funnel. The Wheaton bottle was rinsed with 10 ml heptane. The viscosity of the reaction mixture decreased dramatically and became normal.

The rest of the catalyst preparation, i.e., addition of ClTi(O$^i$Pr)$_3$, the first titanation with TiCl$_4$/Ti(OBu)$_4$ and the second titanation with TiCl$_4$ was carried out in as usual. The yield of the solid catalyst was 6.2 g.

EXAMPLE 22

100 mmol of BEM in heptane solution was weighed into a 250 ml measuring cylinder. 1.38 g TEAL (24.8% in heptane) and 9.48 g DIAE were added to the BEM solution. The mixture was cannulated into a 1 L 5-neck flask with standard set-up. The cylinder was rinsed with 20 ml heptane. The solution was stirred at room temperature at 150 rpm.

27.18 g 2-Et-HexOH was weighed into a 50 ml measuring cylinder, and diluted to 50 ml with heptane. The alcohol solution was transferred to the 60 ml addition funnel. The cylinder was rinsed with 10 ml heptane. The alcohol solution was added to the 1 L flask at room temperature in 15 mins. The colorless solution was stirred at room temperature for 45 mins.

100 mmol of ClTi(O$^i$Pr)$_3$ was weighed into a 100 ml measuring cylinder and transferred to the 60 ml addition funnel (50 ml at a time). The solution was added dropwise to the 1 L flask at room temperature over 39 minutes. The addition funnel was rinsed with 10 ml heptane. The reaction mixture was stirred at room temperature for one hour.

34.0 g Ti(OBu)$_4$ was weighed into a 200 ml flask. 38.0 g TiCl$_4$ was weighed into a 50 ml measuring cylinder and diluted to 50 ml with heptane. The TiCl$_4$ solution was transferred to the 200 ml flask. The cylinder was rinsed with 90 ml heptane. The orange-brown reaction mixture was stirred at room temperature for 45 mins.

The TiCl$_4$/Ti(OBu)$_4$ solution was transferred to the 60 ml t-P addition funnel on the 1 L and added dropwise to the flask at room temperature over 1 hr and 40 mins. The reaction mixture was stirred at room temperature for another hour and then was allowed to settle. The supernatant was decanted. The solid was washed twice with 200 ml portions of heptane, then reslurried in ca. 180 ml heptane.

9.5 g TiCl$_4$ was weighed into a 50 ml measuring cylinder and diluted to 60 ml with heptane. The TiCl$_4$ solution was added dropwise at room temperature over 30 mins. The addition funnel was rinsed with 10 ml heptane. The reaction mixture was stirred at room temperature for another hour. A slurry sample was taken. A small portion of the slurry was transferred to a 100 ml flask, decanted, washed and dried in vacuo (1.7 g).

7.18 g TEAL (24.8% in heptane) was weighed into a 100 ml measuring cylinder and diluted to 60 ml with heptane. The TEAL solution was added dropwise at room temperature over 26 mins. The reaction mixture was stirred at room temperature for another hour and then was allowed to settle. The supernatant was decanted. The solid was washed four times with 200 ml portions of heptane. The solid was dried in vacuo at room temperature for 2 hrs. (16.1 g).

TABLE II

| Example | Yield (g) | Productivity (g/g · hr) | % fines (<125 μm) | Average Catalyst Particle Size (microns) |
|---|---|---|---|---|
| 8. | 375 | 28,000 | 1.0 | 11.0 |
| 12. | 253 | 33,000 | 0.6 | 13.0 |
| 13. | 304 | 37,000 | 0.8 | 12.4 |
| 14. | 352 | 34,000 | 19.1 | 9.8 |
| 15. | 378 | 48,000 | 3.2 | 13.5 |
| 16. | 483 | 60,000 | 2.2 | 13.5 |
| 17 | 155 | 64,000 | 9.8 | 10.8 |
| 18. | 418 | 57,000 | 3.6 | 11.4 |
| 19. | 406 | 42,000 | 2.6 | 14.7 |
| 20. | 392 | 45,000 | 1.8 | 12.6 |
| 21. | 492 | 51,000 | 4.1 | 12.8 |
| 22. | 405 | 48,000 | 1.8 | 18.6 |

Concentration of the TiCl$_4$Ti(OBu)$_4$ and the amount of TiCl$_4$ used for the second titanation did not have any effect on catalyst performance and fluff morphology. Temperatures of the first titanation which were higher or lower than room temperature resulted in smaller catalyst particle size, slower catalyst settling and more fines in the polymer fluff. Catalyst synthesis is preferably carried out at room (ambient) temperature. Heat treatment after the first titanation had little effect on catalyst morphology. Addition of DIAE results in slightly more fines but ti) significantly improves catalyst activity. The electron donor is believed to increase the integrity of and reduce fragmentation of the catalyst particles. Use of an alkyl aluminum such as TEAl during catalyst synthesis helps reduce viscosity of the magnesium alkoxide. Addition of an electron donor such as an ether, e.g., diisoamyl ether (DIAE), may be used to further reduce the viscosity of the alkyl magnesium and the magnesium alkoxide reaction product. The preactivation of the catalyst increases catalyst particle size and narrows particle size distribution.

The amount of fines in the fluff that were produced by the improved catalyst is much less than that produced by the comparative catalyst. Considering fluff particles smaller than 125 microns, the fluff produced by the comparative catalyst contain 3–5% of such particles, while the improved catalyst produced fluffs containing 1–2%.

What is claimed as new and desired to be secured by Letter of Patent of the United States of America is:

1. A catalyst for polymerizing ethylene comprising a reaction product of the following in the order of:
   a) an alkyl magnesium compound of the general formula MgRR' where R and R' are alkyl groups of 1–10 carbon atoms and R and R' may be the same or different;
   b) an aluminum alkyl;
   c) an alcohol of the general formula R*OH wherein the alcohol is linear or branched and wherein R* is an alkyl group of 4–20 carbon atoms,
wherein the alkyl magnesium compound and the alcohol react in the presence of the aluminum alkyl to form a soluble magnesium compound of magnesium dialkoxide of the general formula $Mg(OR")_2$ where R" is a hydrocarbyl of 1 to 20 carbon atoms;
   d) a chlorinating agent capable of partially chlorinating the soluble magnesium compound by exchanging one chlorine for one alkoxide of the magnesium compound;
   e) a first chlorinating-titanating agent;
   f) a second stronger chlorinating-titanating agent; and
   g) an organoaluminum compound preactivating agent.

2. The catalyst of claim 1 wherein the soluble magnesium compound is a reaction product of an alkyl magnesium compound of the general formula MgRR', where R and R' are alkyl groups of 1–10 carbon atoms and may be the same or different, and an alcohol of the general formula R"OH where R" is an alkyl group of 2–10 carbon atoms.

3. The catalyst of claim 1 wherein the alkyl magnesium compound is magnesium diethyl, magnesium dipropyl, magnesium dibutyl or butylethylmagnesium.

4. The catalyst of claim 1 wherein the alkyl magnesium compound is butylethylmagnesium.

5. The catalyst of claim 1 wherein the alcohol is linear or branched.

6. The catalyst of claim 1 wherein the alcohol is ethanol, propanol, isopropanol, butanol, isobutanol or 2-ethylhexanol.

7. The catalyst of claim 6 wherein the alcohol is 2-ethylhexanol.

8. The catalyst of claim 1 wherein the soluble magnesium compound is magnesium di(2-ethylhexoxide).

9. The catalyst of claim 1 wherein the aluminum alkyl is triethylaluminum.

10. The catalyst of claim 1 wherein the molar ratio of alkyl aluminum to magnesium is 0.001:1 to 1:1.

11. The catalyst of claim 10 wherein the ratio of alkyl aluminum to magnesium is 0.01 to 0.1:1.

12. The catalyst of claim 11 wherein the ratio of alkyl aluminum to magnesium is 0.03:1 to 0.05:1.

13. The catalyst of claim 1 wherein the chlorinating agent is of the general formula $ClAR'''_x$ or $ClAOR'''_x$, where A is titanium, silicon, aluminum, carbon, tin or germanium, R''' is alkyl and x is the valence of A minus 1.

14. The catalyst of claim 13 wherein A is titanium or silicon and x is 3.

15. The catalyst of claim 13 wherein R''' has 2–6 carbon atoms.

16. The catalyst of claim 13 wherein R''' is methyl, ethyl, propyl, or isopropyl.

17. The catalyst of claim 13 wherein the chlorinating agent is $ClTi(O^iPr)_3$ or $ClSi(Me)_3$.

18. The catalyst of claim 17 wherein the chlorinating agent is $ClTi(O^iPr)_3$.

19. The catalyst of claim 13 wherein the first chlorinating-titanating agent is a blend of a titanium chloride and a titanium alkoxide.

20. The catalyst of claim 19 wherein the first chlorinating-titanating agent is a blend of $TiCl_4$ and $Ti(OBu)_4$.

21. The catalyst of claim 20 wherein the first chlorinating-titanating agent is a blend of $TiCl_4$ and $Ti(OBu)_4$ in a range from 0.5:1 to 6:1 $TiCl_4/Ti(OBu)_4$.

22. The catalyst of claim 21 wherein the first chlorinating-titanating agent is a blend of $TiCl_4$ and $Ti(OBu)_4$ in a range from 2:1 to 3:1.

23. The catalyst of claim 22 wherein the molar ratio of titanium to magnesium in step e) is 3:1.

24. The catalyst of claim 1 wherein the first chlorinating-titanating agent is a blend of two tetra-substituted titanium compounds with all four substituents being the same and the substituents being a chloride or an alkoxide or phenoxide with 2 to 10 carbon atoms.

25. The catalyst of claim 1 wherein the first chlorinating-titanating agent is a titanium alkoxychloride of the general formula $Ti(OR)_aX_b$, where OR and X are an alkoxide and chloride, respectively, a+b is the valence of titanium.

26. The catalyst of claim 25 wherein the first chlorinating-titanating agent is $Ti(OC_2H_5)_3Cl$, $Ti(OC_3H_7)_2Cl_2$, $Ti(OC_3H_7)_3Cl$, $Ti(OC_4H_9)Cl_3$3, $Ti(OC_6H_{13})_2Cl_2$ or $Ti(OC_{12}H_{25})Cl_3$.

27. The catalyst of claim 1 additionally comprising an electron donor of the general formula $RSi(OR')_3$ where R and R' are alkyls with 1–5 carbon atoms and may be the same or different.

28. The catalyst of claim 27 wherein the electron donor is methylsilyltriethoxide.

29. The catalyst of claim 1 wherein the second stronger chlorinating-titanating agent is a titanium chloride.

30. The catalyst of claim 29 wherein the second stronger chlorinating-titanating agent is titanium tetrachloride.

31. The catalyst of claim 30 wherein the range of titanium to magnesium is 0.5:1 to 1:1.

32. The catalyst of claim 1 wherein the organoaluminum preactivating agent is an aluminum alkyl of the formula $AlR^\wedge_3$ where $R^\wedge$ is an alkyl having 1–8 carbon atoms or a halide, $R^\wedge$ being the same or different and at least one $R^\wedge$ is an alkyl.

33. The catalyst of claim 32 wherein the organoaluminum preactivating agent is a trialkyl aluminum.

34. The catalyst of claim 33 wherein the organoaluminum preactivating agent is trimethyl aluminum, triethyl aluminum or triisobutyl aluminum.

35. The catalyst of claim 34 wherein the organoaluminum preactivating agent is triethyl aluminum.

36. The catalyst of claim 1 wherein the molar ratio of Al to titanium is in the range from 0.1:1 to 2:1.

37. The catalyst of claim 36 wherein the ratio of Al to titanium is in the range from 0.5:1 to 1.2:1.

38. The catalyst of claim 37 wherein the ratio of Al to titanium is approximately 0.8:1.

39. The catalyst of claim 1 wherein the first chlorinating-titanating agent is a blend of a titanium halide and a titanium alkoxide the second stronger chlorinating-titanating agent is a titanium halide.

40. The catalyst of claim 39 wherein the first chlorinating-titanating agent is a blend of $TiCl_4$ and $Ti(OBu)_4$ and the second stronger chlorinating-titanating agent is $TiCl_4$.

41. The catalyst of claim 39 wherein the first chlorinating-titanating agent is $Ti(OC_2H_5)_3Cl$, $Ti(OC_3H_7)_2C_2$, $Ti(OC_3H_7)_3Cl$, $Ti(OC_4H_9)C_3$, $Ti(OC_6H_{13})_2Cl_2$ or $Ti(OC_{12}H_{25})Cl_3$ and the second stronger chlorinating-titanating agent is titanium tetrachloride.

42. The catalyst of claim 1 wherein the catalyst is a reaction product of the following in the order of:
   a) butylethyl magnesium;
   b) triethylaluminum;
   c) 2-ethylhexanol, wherein the butylethylmagnesium and the 2-ethylhexanol react in the presence of the triethylaluminum to form soluble magnesium di(2-ethylhexoxide);
   d) a chlorinating agent of $ClTi(O^iPR)_3$ or $ClSi(Me)_3$;
   e) a blend of $TiCl_4$ and $Ti(OBu)_4$;
   f) $TiCl_4$; and
   g) triethylaluminum.

43. A catalyst for polymerizing ethylene comprising a reaction product of the following in the order of:
   a) an alkyl magnesium compound of the general formula MgRR' where R and R' are alkyl groups of 1–10 carbon atoms and R and R' may be the same or different;
   b) an aluminum alkyl;
   c) an electron donor:
   d) an alcohol of the general formula R**OH wherein the alcohol is linear or branched and wherein $R_1$ is an alkyl group of 4–20 carbon atoms,
wherein the alkyl magnesium compound and the alcohol react in the presence of the aluminum alkyl and the electron donor to form a soluble magnesium compound of magnesium dialkoxide of the general formula $Mg(OR'')_2$ where R" is a hydrocarbyl of 1 to 20 carbon atoms;
   e) a chlorinating agent capable of partially chlorinating the soluble magnesium compound by exchanging one chlorine for one alkoxide of the magnesium compound;
   f) a first chlorinating-titanating agent;
   g) a second stronger chlorinating-titanating agent; and
   h) an organoaluminum compound preactivating agent.

44. The catalyst of claim 43 wherein the electron donor is an ether.

45. The catalyst of claim 44 wherein the ether is diisoamyl ether.

46. The catalyst of claim 44 wherein the molar ratio of electron donor to magnesium is 0:1 to 10:1.

47. The catalyst of claim 46 wherein the ratio of electron donor to magnesium is 0.1:1 to 1:1.

48. The catalyst of claim 43 wherein the catalyst is the reaction product of the following in the order of:
   a) butylethyl magnesium;
   b) triethylaluminum;
   c) diisoamyl ether;
   d) 2-ethylhexanol, wherein the butylethylmagnesium and the 2-ethylhexanol react in the presence of the triethylaluminum and diisoamyl ether to form soluble magnesium di(2-ethylhexoxide);
   e) a chlorinating agent of $ClTi(O^iPR)_3$ or $ClSi(Me)_3$;
   f) a blend of $TiCl_4$ and $Ti(OBu)_4$;
   g) $TiCl_4$; and
   h) triethylaluminum.

49. A catalyst for polymerizing ethylene comprising a reaction product of the following in the order of:
   a) an alkyl magnesium compound of the general formula MgRR' where R and R' are alkyl groups of 1–10 carbon atoms and R and R' may be the same or different;
   b) an aluminum alkyl;
   c) an alcohol of the general formula R*OH wherein the alcohol is linear or branched and wherein R* is an alkyl group of 4–20 carbon atoms,
wherein the alkyl magnesium compound and the alcohol react in the presence of the aluminum alkyl to form a soluble magnesium compound of magnesium dialkoxide of the general formula $Mg(OR'')_2$ where R" is a hydrocarbyl of 1 to 20 carbon atoms;
   d) a chlorinating agent capable of partially chlorinating the soluble magnesium compound by exchanging one chlorine for one alkoxide of the magnesium compound;
   e) a mixture of a first chlorinating-titanating agent and an electron donor;
   f) a second stronger chlorinating-titanating agent; and
   g) an organoaluminum compound preactivating agent.

50. The catalyst of claim 49 wherein the electron donor is an alkylsilylalkoxide of the general formula $RSi(OR')_3$, where R and R' are alkyls with 1–5 carbon atoms and may be the same or different.

51. The catalyst of claim 50 wherein the electron donor is methylsilyltriethoxide.

52. The catalyst of claim 49 wherein the catalyst is the reaction product of the following in the order of:
   a) butylethyl magnesium;
   b) triethylaluminum;
   c) 2-ethylhexanol, wherein the butylethylmagnesium and the 2-ethylhexanol react in the presence of the triethylaluminum to-form soluble magnesium di(2-ethylhexoxide);
   d) a chlorinating agent of $ClTi(O^iPR)_3$ or $ClSi(Me)_3$;
   e) a mixture of a blend of $TiCl_4$ and $Ti(OBu)_4$ and methylsilyltriethoxide;
   f) $TiCl_4$; and
   g) triethylaluminum.

53. A process for synthesizing a catalyst comprising:
   a) selecting a soluble magnesium dialkoxide compound of the general formula $Mg(OR)_2$ where R is a hydrocarbyl or substituted hydrocarbyl of 1 to 20 carbon atoms;
   b) adding a chlorinating agent capable of exchanging one chlorine for one alkoxide;
   c) adding a first chlorinating/titanating agent;
   d) adding a second stronger chlorinating/titanating agent; and
   e) adding an organoaluminum preactivating agent.

54. The process of claim 53 wherein the soluble magnesium compound is a reaction product of an alkyl magnesium compound of the general formula MgRR', where R and R' are alkyl groups of 1–10 carbon atoms and may be the same or different, and an alcohol of the general formula R"OH where R" is an alkyl group of 2–10 carbon atoms.

55. The process of claim 54 wherein the alkyl magnesium compound is magnesium diethyl, magnesium dipropyl, magnesium dibutyl or butylethylmagnesium.

56. The process of claim 55 wherein the alkyl magnesium compound is butylethylmagnesium.

57. The process of claim 54 wherein the alcohol is linear or branched.

58. The process of claim 54 wherein the alcohol is ethanol, propanol, isopropanol, butanol, isobutanol or 2-ethylhexanol.

59. The process of claim 58 wherein the alcohol is 2-ethylhexanol.

60. The process of claim 53 wherein the soluble magnesium compound is a magnesium di(2-ethylhexoxide).

61. The process of claim 53 additionally comprising an aluminum alkyl in step a).

62. The process of claim 61 wherein the aluminum alkyl is triethylaluminum.

63. The process of claim 61 wherein the ratio of alkyl aluminum to magnesium is 0.001:1 to 1:1.

64. The process of claim 63 wherein the ratio of alkyl aluminum to magnesium is 0.01 to 0.1:1.

65. The process of claim 64 wherein the ratio of alkyl aluminum to magnesium is 0.03:1 to 0.05:1.

66. The process of claim 53 additionally comprising an electron donor which is an ether.

67. The process of claim 66 wherein the ether is diisoamyl ether.

68. The process of claim 66 wherein the ratio of electron donor to magnesium is 0:1 to 10:1.

69. The process of claim 68 wherein the ratio of electron donor to magnesium is 0.1:1 to 1:1.

70. The process of claim 53 wherein the chlorinating agent is of the general formula $ClAR'''_x$ or $ClAOR'''_x$, where A is a nonreducing oxyphilic compound which is capable of exchanging one chloride for an alkoxide, R''' is alkyl and x is the valence of A minus 1.

71. The process of claim 70 wherein A is titanium, silicon, aluminum, carbon, tin or germanium.

72. The process of claim 71 wherein A is titanium or silicon and x is 3.

73. The process of claim 70 wherein R''' has 2–6 carbon atoms.

74. The process of claim 73 wherein R''' is methyl, ethyl, propyl, or isopropyl.

75. The process of claim 70 wherein the chlorinating agent is $ClTi(O^iPr)_3$ or $ClSi(Me)_3$.

76. The process of claim 75 wherein the chlorinating agent is $ClTi(O^iPr)_3$.

77. The process of claim 53 wherein the first mild chlorinating/titanating agent is a blend of two tetra-substituted titanium compounds with all four substituents being the same and the substituents being a halide or an alkoxide or phenoxide with 2 to 10 carbon atoms.

78. The process of claim 77 wherein the first mild chlorinating/titanating agent is a blend of a titanium halide and a titanium alkoxide.

79. The process of claim 78 wherein the first mild chlorinating/titanating agent is a blend of $TiCl_4$ and $Ti(OBu)_4$.

80. The process of claim 79 wherein the first mild chlorinating/titanating agent is a blend of $TiCl_4$ and $Ti(OBu)_4$ in a range from 0.5:1 to 6:1 $TiCl_4/TiOBu)_4$.

81. The process of claim 80 wherein the first mild chlorinating/titanating agent is a blend of $TiCl_4$ and $Ti(OBu)_4$ in a range from 2:1 to 3:1.

82. The process of claim 81 wherein the ratio of titanium to magnesium is 3:1.

83. The process of claim 53 wherein the first mild chlorinating/titanating agent is a titanium alkoxyhalide of the general formula $Ti(OR)_aX_b$, where OR and X are an alkoxide and a halide, respectively, and a+b is the valence of titanium.

84. The process of claim 83 wherein the first mild chlorinating/titanating agent is $Ti(OC_2H_5)_3Cl$, $Ti(OC_3H_7)_2Cl_2$, $Ti(OC_3H_7)_3Cl$, $Ti(OC_4H_9)Cl_3$, $Ti(OC_6H_{13})_2Cl_2$ or $Ti(OC_{12}H_{25})Cl_3$.

85. The process of claim 53 additionally-comprising an electron donor of the general formula $RSi(OR')_3$ where R and R' are alkyls with 1–5 carbon atoms and may be the same or different.

86. The process of claim 85 wherein the electron donor is methylsilyltriethoxide.

87. The process of claim 53 wherein the second stronger chlorinating/titanating agent is a titanium halide.

88. The process of claim 87 wherein the second stronger chlorinating/titanating agent is titanium tetrachloride.

89. The process of claim 88 wherein the range of titanium to magnesium is 0:1 to 2:1.

90. The process of claim 89 wherein the range of titanium to magnesium is 0.5:1 to 1:1.

91. The process of claim 53 wherein the organoaluminum preactivating agent is aluminum alkyl of the formula Al R^3 where R^ is an alkyl having 1–8 carbon atoms or a halide, R^ being the same or different and at least one R^ is an alkyl.

92. The process of claim 91 wherein the organoaluminum preactivating agent is a trialkyl aluminum.

93. The process of claim 92 wherein the organoaluminum preactivating agent is trimethyl aluminum, triethyl aluminum or triisobutyl aluminum.

94. The process of claim 93 wherein the organoaluminum preactivating agent is triethyl aluminum.

95. The process of claim 53 wherein the ratio of Al to titanium is in the range from 0.1:1 to 2:1.

96. The process of claim 95 wherein the ratio of Al to titanium is in the range from 0.5:1 to 1.2:1.

97. The process of claim 96 wherein the ratio of Al to titanium is approximately 0.8:1.

98. A process for polymerizing ethylene comprising:
 a) synthesizing a catalyst comprising a reaction product of the following in the order of:
  1) an alkylmagnesium compound of the genera formula MgRR' where R and R' are alkyl groups of 1–10 carbon atoms and R and R' may be same or different;
  2) an aluminum alkyl;
  3) an alcohol of the general formula R*—OH wherein the alcohol is linear or branched and wherein R* is an alkyl group of 4–20 carbon atoms,
  wherein the alkyl magnesium and the alcohol react in the Presence of the aluminum alkyl to form a soluble magnesium compound of magnesium dialkoxide of the general formula $Ma(OR'')_2$ where R'' an hydrocarbyl of 1 to 20 carbon atoms;
  4) a chlorinating agent capable of partially chlorinating the soluble magnesium compound by exchanging one chlorine for one alkoxide of the magnesium compound;
  5) a first chlorinating-titanating agent;
  6) a second stronger chlorinating-titanating agent;
 or
  1') an alkylmagnesium compound of the genera formula MgRR' where R and R' are alkyl groups of 1–10 carbon atoms and R and R' may be same or different;
  2') an aluminum alkyl;

3') an electron donor;

4') an alcohol of the general formula R*—OH wherein the alcohol is linear or branched and wherein R* is an alkyl group of 4–20 carbon atoms, wherein the alkyl magnesium and the alcohol react in the presence of the aluminum alkyl to form a soluble magnesium compound of magnesium dialkoxide of the general formula Ma(OR")$_2$ where R" is an hydrocarbyl of 1 to 20 carbon atoms;

5') a chlorinating agent capable of partially chlorinating the soluble magnesium compound by exchanging one chlorine for one alkoxide of the magnesium compound;

6') a first chlorinating-titanating agent;

7') a second stronger chlorinating-titanating agent;

or

1") an alkylmagnesium compound of the genera formula MQRR' where R and R' are alkyl groups of 1–10 carbon atoms and R and R' may be same or different;

2") an aluminum alkyl;

3") an alcohol of the general formula R*—OH wherein the alcohol is linear or branched and wherein R is an alkyl croup of 4–20 carbon atoms.

wherein the alkyl magnesium and the alcohol react in the presence of the aluminum alkyl to form a soluble magnesium compound of magnesium dialkoxide of the general formula Mg(OR")$_2$ where R" is an hydrocarbyl of 1 to 20 carbon atoms;

4") a chlorinating agent capable of partially chlorinating the soluble magnesium compound by exchanging one chlorine for one alkoxide of the magnesium compound;

5") a mixture of a first chlorinating-titanating agent and an electron donor;

6") a second stronger chlorinating-titanating agent;

b) activating the catalyst with an organoaluminum compound preactivating agent;

c) contacting the catalyst with ethylene monomer under polymerization conditions; and d) extracting polyethylene.

99. The process of claim 98 additionally comprising an aluminum alkyl in a) 1).

100. The process of claim 99 wherein the ratio of alkyl aluminum to magnesium is 0.001:1 to 1:1.

101. The process of claim 100 wherein the ratio of alkyl aluminum to magnesium is 0.01 to 0.1:1.

102. The process of claim 101 wherein the ratio of alkyl aluminum to magnesium is 0.03:1 to 0.05:1.

103. The process of claim 98 wherein the electron donor of a) 3') is an ether.

104. The process of claim 103 wherein the ether is diisoamyl ether.

105. The process of claim 103 wherein the ratio of electron donor to magnesium is 0:1 to 10:1.

106. The process of claim 105 wherein the ratio of electron donor to magnesium is 0.1:1 to 1:1.

107. The process of claim 98 additionally comprising prepolymerizing the catalyst.

108. The process of claim 98 wherein polymerization is in bulk, slurry or gas phase.

109. The process of claim 108 wherein polymerization is in slurry phase.

110. The process of claim 109 wherein slurry polymerization is in temperature range of 50–120° C.

111. The process of claim 110 wherein slurry polymerization is in a temperature range of 50–100° C.

112. The process of claim 111 wherein slurry polymerization is in a temperature range of 70–80° C.

113. The process of claim 109 wherein slurry polymerization is in a pressure range of 50–800 psi.

114. The process of claim 113 wherein slurry polymerization is in a pressure range of 80–600 psi.

115. The process of claim 114 wherein slurry polymerization is in a pressure range 100–150 psi.

116. The process of claim 98 wherein the olefin monomer is introduced into the polymerization reaction zone in a diluent which is a nonreactive heat transfer agent and is liquid at the reaction conditions.

117. The process of claim 116 wherein the diluent is hexane or isobutane.

118. The process of claim 109 wherein the slurry polymerization is a copolymerization of ethylene and butene.

119. The process of claim 118 wherein butene is present at 0.01–20 mole percent.

120. The process of claim 119 wherein butene is present at 0.02–1 mole percent.

121. The process of claim 120 wherein butene is present from about 0.04 to about 0.08 mole percent.

* * * * *